United States Patent
Cho (10) Patent No.: US 12,288,378 B2
(45) Date of Patent: *Apr. 29, 2025

(54) IMAGE PROCESSING METHOD AND APPARATUS

(71) Applicant: Samsung Electronics Co., Ltd., Suwon-si (KR)

(72) Inventor: Yeongon Cho, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,219

(22) Filed: Sep. 25, 2023

(65) Prior Publication Data

US 2024/0013515 A1 Jan. 11, 2024

Related U.S. Application Data (63) Continuation of application No. 17/097,602, filed on Nov. 13, 2020, now Pat. No. 11,804,031.

(30) Foreign Application Priority Data

Jul. 1, 2020 (KR) .......................... 10-2020-0081108

(51) Int. Cl.
| | | |
|---|---|---|
| *G06T 7/70* | (2017.01) | |
| *G06F 18/211* | (2023.01) | |
| *G06F 21/60* | (2013.01) | |
| *G06T 5/70* | (2024.01) | |
| *G06T 7/11* | (2017.01) | |
| *G06T 7/50* | (2017.01) | |
| *G06V 10/771* | (2022.01) | |
| *G06V 20/40* | (2022.01) | |
| *H04N 7/04* | (2006.01) | |
| *G06V 20/20* | (2022.01) | |

(52) U.S. Cl.
CPC .......... *G06V 10/771* (2022.01); *G06F 18/211* (2023.01); *G06F 21/602* (2013.01); *G06T 5/70* (2024.01); *G06T 7/11* (2017.01); *G06T 7/50* (2017.01); *G06T 7/70* (2017.01); *G06V 20/46* (2022.01); *H04N 7/04* (2013.01); *G06V 20/20* (2022.01)

(58) Field of Classification Search
CPC .......... G06T 7/70; H04N 5/144; G06K 9/6228
See application file for complete search history.

(56) References Cited

U.S. PATENT DOCUMENTS

| | | | |
|---|---|---|---|
| 8,872,940 | B2 | 10/2014 | Marman et al. |
| 9,959,659 | B2 | 5/2018 | Cho et al. |
| 10,452,892 | B2 | 10/2019 | Hanai |
| 2009/0219411 | A1 | 9/2009 | Marman et al. |

(Continued)

FOREIGN PATENT DOCUMENTS

| | | |
|---|---|---|
| JP | 2012-74999 A | 4/2012 |
| KR | 10-0776805 B1 | 11/2007 |

(Continued)

*Primary Examiner* — Myron Wyche
(74) *Attorney, Agent, or Firm* — NSIP Law (57) ABSTRACT

Disclosed is an image processing method and apparatus. The image processing method includes obtaining visual information related to an object in an image, generating valid data from the image based on the visual information, and transmitting the valid data.

7 Claims, 5 Drawing Sheets

(56) References Cited

U.S. PATENT DOCUMENTS

| | | | |
|---|---|---|---|
| 2010/0103249 | A1 | 4/2010 | Lipton et al. |
| 2011/0242423 | A1 | 10/2011 | Lee et al. |
| 2012/0148216 | A1 | 6/2012 | Pavagada et al. |
| 2016/0163087 | A1 | 6/2016 | Cho et al. |
| 2017/0017830 | A1 | 1/2017 | Hanai |
| 2019/0073748 | A1 | 3/2019 | Lu et al. |
| 2019/0073749 | A1 | 3/2019 | Lin et al. |
| 2019/0098278 | A1 | 3/2019 | Koizumi |
| 2022/0005219 | A1* | 1/2022 | Cho .......................... G06T 5/70 |

FOREIGN PATENT DOCUMENTS

| | | |
|---|---|---|
| KR | 10-1426961 B1 | 8/2014 |
| KR | 10-2017148 B1 | 9/2019 |
| KR | 10-2019-0128735 A | 11/2019 |

\* cited by examiner

IMAGE PROCESSING METHOD AND APPARATUS

CROSS-REFERENCE TO RELATED APPLICATIONS

This application is a Continuation Application of U.S. patent application Ser. No. 17/097,602 filed on Nov. 13, 2020, now U.S. Pat. No. 11,804,031, which claims the benefit under 35 USC § 119(a) of Korean Patent Application No. 10-2020-0081108 filed on Jul. 1, 2020, in the Korean Intellectual Property Office, the entire disclosure of which is incorporated herein by reference for all purposes.

BACKGROUND

Field

The following description relates to an image processing method and apparatus.

Description of Related Art

An image sensor refers to a device that acquires or captures an image by using the property of a semiconductor responding to light. Recently, with the development of complementary metal oxide semiconductor (CMOS) technology, an image sensor using a CMOS transistor has been widely used.

In general, an image sensor requires a large source voltage to obtain a high-quality image. More than 50% of the power consumption of the image sensor is concentrated in a data transmission unit to a host device and an analog-to-digital converter (ADC).

To provide a high-quality image, the data transmission rate has to be increased as the number of pixels of the image sensor increases, which increases the power consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an image processing method, including obtaining visual information related to an object in an image, generating valid data from the image based on the visual information, and transmitting the valid data.

The visual information may include depth information of the object, and position information of the object.

The obtaining of the visual information may include calculating a change in pixel value between a current frame and a previous frame of the image.

The generating of the valid data may include determining a region occluded by the object in the image based on the visual information, and generating the valid data by excluding the occluded region from the image.

The determining may include determining a relative depth of the object in the image based on depth information of the object in the visual information, and determining the occluded region based on the relative depth and position information of the object in the visual information.

The generating of the valid data may include generating the valid data by transforming a region corresponding to the object in the image based on a position of the object.

The transforming of the region corresponding to the object in the image based on a position of the object may include encrypting the region corresponding to the object based on the position of the object.

The transforming of the region corresponding to the object based on a position of the object may include blurring the region corresponding to the object based on the position of the object.

The generating of the valid data may include segmenting the image into regions, determining a region in which a change in pixel value occurs from among the regions, and generating the valid data based on a position of the region in which the change in the pixel value occurs and the pixel value.

The obtaining of the visual information may include storing a previous frame of the image.

In another general aspect, there is provided an image processing apparatus, including a processor configured to obtain visual information related to an object in an image, generate valid data from the image based on the visual information, and transmit the valid data.

The visual information may include depth information of the object, and position information of the object.

The processor may be configured to calculate a change in pixel value between a current frame and a previous frame of the image.

The processor may be configured to determine a region occluded by the object in the image based on the visual information, and generate the valid data by excluding the occluded region from the image.

The processor may be configured to determine a relative depth of the object in the image based on depth information of the object in the visual information, and determine the occluded region based on the relative depth and position information of the object in the visual information.

The processor may be configured to generate the valid data by transforming a region corresponding to the object in the image based on a position of the object.

The processor may be configured to generate the valid data by encrypting the region corresponding to the object based on the position of the object.

The processor may be configured to generate the valid data by blurring the region corresponding to the object based on the position of the object.

The processor may be configured to segment the image into regions, determine a region in which a change in pixel value occurs from among the regions, and generate the valid data based on a position of the region in which the change in the pixel value occurs and the pixel value.

The memory may be configured to store a previous frame of the image and to store instructions to be executed by the processor.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. As used herein, the term "and/or" includes any one and any combination of any two or more of the associated listed items. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The use of the term "may" herein with respect to an example or embodiment (e.g., as to what an example or embodiment may include or implement) means that at least one example or embodiment exists where such a feature is included or implemented, while all examples are not limited thereto.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The same name may be used to describe an element included in the examples described above and an element having a common function. Unless otherwise mentioned, the descriptions on the examples may be applicable to the following examples and thus, duplicated descriptions will be omitted for conciseness.

Figure 1:
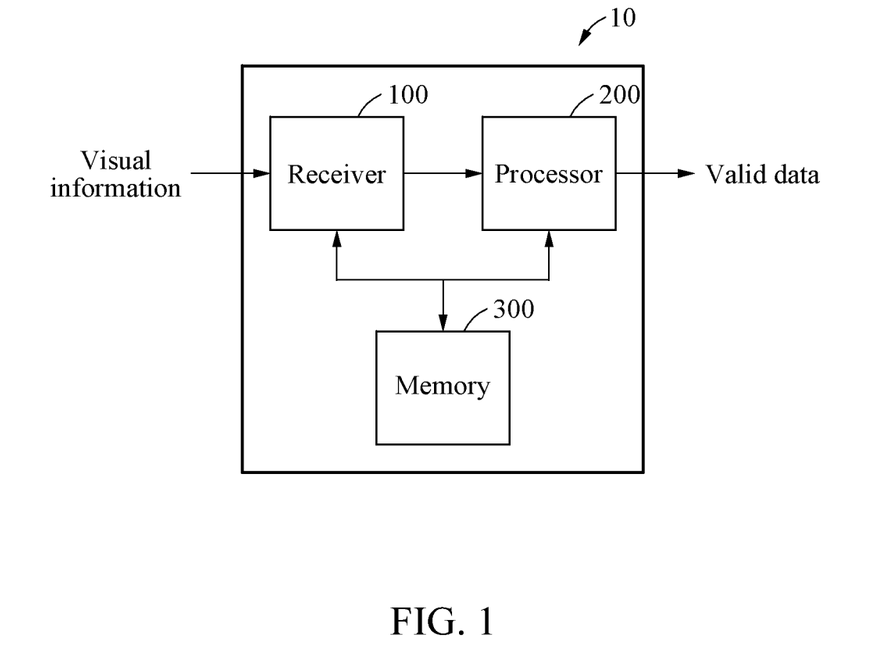
FIG. 1 illustrates an example of an image processing apparatus.

FIG. 1 illustrates an example of an image processing apparatus.

Referring to FIG. 1, an image processing apparatus 10 may process an image. The image processing apparatus 10 may process the image, thereby reducing power consumption for transmitting the image.

The image processing apparatus 10 may process the image and transmit the processed image to a host device. In an example, the image processing apparatus 10 may generate valid data by processing the image and transmit only the valid data to the host device, thereby reducing power consumption.

When a general image sensor is used, more than 50% of the power consumption of a sensor unit is concentrated in a data transmission unit to a host device and an analog-to-digital converter (ADC). When the number of pixels of the image sensor increases, the data transmission rate increases resulting in an increase in the power consumption.

The image processing apparatus 10 may determine data to be finally displayed, thereby generating valid data including only data that is needed and transmitting the valid data to the host device. The image processing apparatus 10 may process the image, thereby reducing power consumption for transmitting the data to the host device.

For example, the image processing apparatus 10 and the host device may be implemented as an Internet of Things (IoT) device, a machine-type communication device, a portable electronic device, or a wearable electronic device, such as a for example smart watch, a smart band or smart glasses.

The portable electronic device may be a device such as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, or a smart device, a home appliance such as a television, a smart television, a refrigerator, a smart home device, or a vehicle such as a smart vehicle, an electric vehicle, or any other device capable of wireless communication consistent with that disclosed herein.

The image processing apparatus 10 may include a sensor (not shown). In another example, the image processing apparatus 10 may receive sensing data from a separate sensor located outside. For example, the sensor may include an image sensor and a depth sensor.

The image processing apparatus 10 includes a processor 200 and a memory 300. The image processing apparatus 10 may further include a receiver 100.

The receiver 100 may receive the image. The receiver 100 may receive visual information. The receiver 100 may include a sensor (not shown). In an example, the receiver 100 may not include a sensor, and receive visual information from a sensor located outside.

The receiver 100 may output the received visual information and image to the processor 200 or the memory 300.

The processor 200 may process the received visual information and data stored in the memory 300. The processor 200 may execute a computer-readable code (for example, software) stored in the memory 300 and instructions triggered by the processor 200.

The "processor 200" may be a data processing device implemented by hardware including a circuit having a physical structure to perform desired operations. For example, the desired operations may include instructions or codes included in a program.

For example, the hardware-implemented data processing device may include a microprocessor, a central processing unit (CPU), a processor core, a multi-core processor, a multiprocessor, an application-specific integrated circuit (ASIC), and a field programmable gate array (FPGA).

The processor 200 may obtain the visual information related to an object included in the image. The image includes an image of an object formed by refraction or reflection of light, and may represent the shape of an object using lines or colors. For example, the image may include information in a form to be processed by a computer.

The image may or may not include an object. The object may include a person or a thing included in the image. Alternatively, the object may be another image that is not included in the image, but is added to the image. The object may include a two-dimensional (2D) or three-dimensional (3D) image.

The visual information may include depth information and position information of the object. The depth information may be information on a depth of the object in the image, and the position information may be information on the position of the object in the image.

For example, when the image is a 2D image on the x-y plane, the depth information may include information on the z-axis coordinate of the object, and the position information may include information on the coordinates x and y of the object.

Also, the visual information may include pixel values of the image. For example, the pixel values may include luminance information of pixels.

The processor 200 may calculate a change in frames of the received image. The processor 200 may calculate a change in pixel value between a current frame and a previous frame of the image.

The processor 200 may generate valid data from the image based on the obtained visual information. The valid data may refer to data that are obtained by removing unnecessary information from the image in a subsequent process of processing the image while including information of the image desired to be transmitted to the host device as much as possible. That is, the processor 200 may generate the valid data by removing the unnecessary information from the image through image processing.

Thus, the processor 200 may reduce power consumption for transmitting/receiving unnecessary data.

The processor 200 may determine a region occluded by the object in the image based on the visual information. If the image includes an object, information on the background at a position occluded by the object may not be needed for subsequent processing.

The occluded region may be a region positioned behind the object. The occluded region may be a region having a depth value greater than that of the object.

The processor 200 may determine a relative depth of the object in the image based on the depth information of the object included in the visual information. For example, the processor 200 may determine the relative depth of the object by comparing the depth information of the object and the depth information of the background.

The processor 200 may determine the occluded region based on the relative depth and the position information of the object included in the visual information. The process of the processor 200 determining the occluded region will be described in detail with reference to FIG. 2.

The processor 200 may generate the valid data by excluding the occluded region from the image. Further, the processor 200 may generate the valid data by transforming a region corresponding to the object in the image based on the position of the object.

The processor 200 may generate the valid data by encrypting the region corresponding to the object based on the position of the object. An example of generating the valid data through encryption will be described in detail with reference to FIG. 3. The processor 200 may generate the valid data by blurring the region corresponding to the object based on the position of the object.

The processor 200 may segment the image into a plurality of regions. The processor 200 may determine a region in which a change in pixel value occurs among the plurality of regions. As described above, the change in pixel value may be a change in pixel value between the current frame and the previous frame of the image.

The processor 200 may generate the valid data based on the position of the region in which a change in pixel value occurs and the pixel value. A process of the processor 200 generating the valid data based on the position of the region in which a change in pixel value occurs and the pixel value will be described in detail with reference to FIG. 5.

The processor 200 may transmit the generated valid data. For example, the processor 200 may transmit the generated valid data to the host device.

The memory 300 stored instructions (or programs) executable by the processor 200. For example, the instructions include instructions to perform an operation of the processor 200 and/or an operation of each element of the processor 200.

The memory 300 is implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a Twin Transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

The memory 300 may store the previous frame of the image. For example, the memory 300 may store the previous frame of the image for comparing pixel values.

Figure 2:
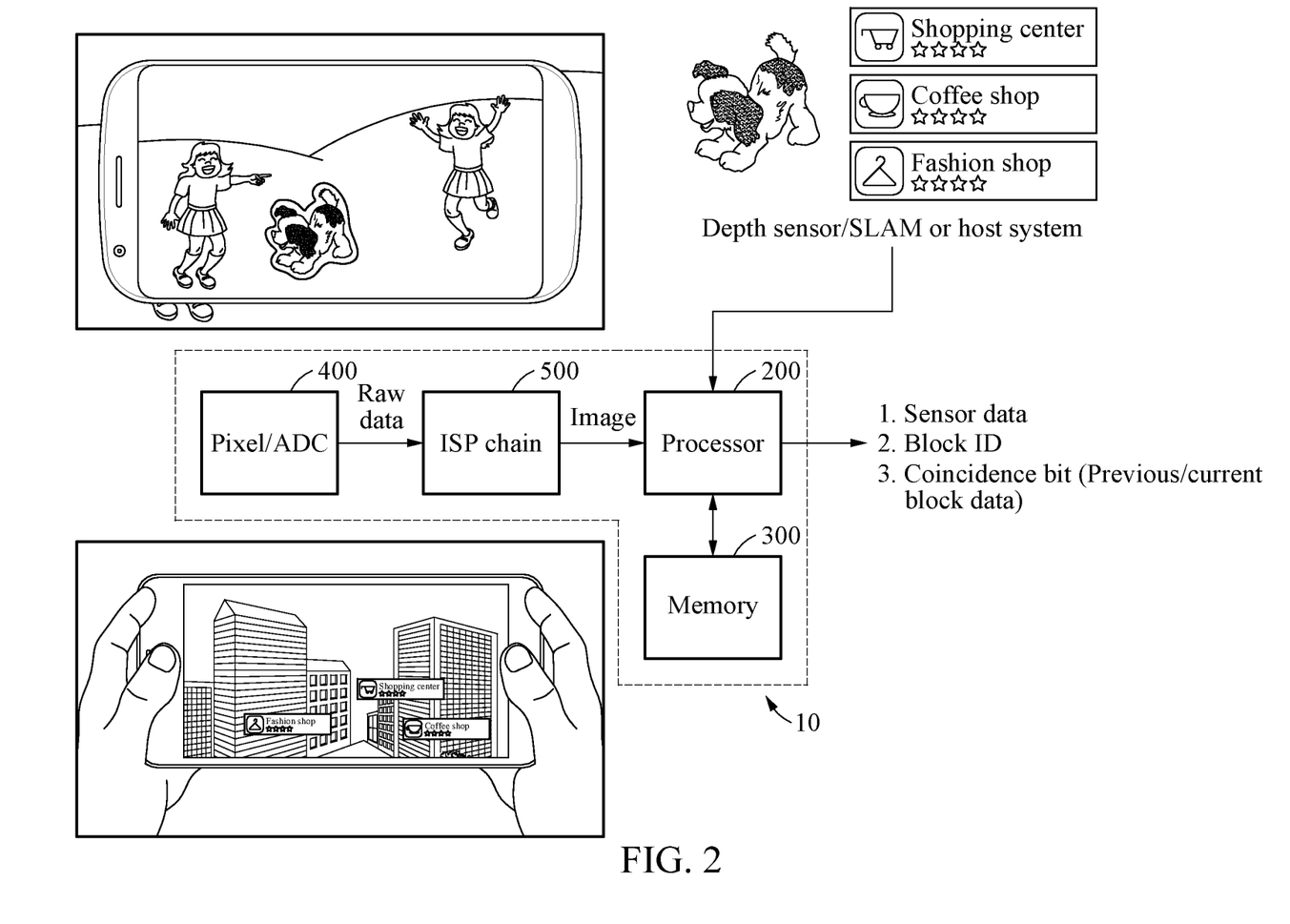
FIG. 2 illustrates an example of image processing performed by the image processing apparatus of FIG. 1.

FIG. 2 illustrates an example of image processing performed by the image processing apparatus of FIG. 1.

Referring to FIG. 2, the processor 200 may generate valid data from an image based on visual information. In an example, the image processing apparatus 10 may further include an ADC 400 and an image signal processing (ISP) chain 500.

The processor 200 may include a central processing unit (CPU), a digital signal processor (DSP), a neural processor or neuromorphic processor, or dedicated hardware.

The ADC 400 may convert pixel values sensed by a sensor (for example, an image sensor) into raw data including digital pixel values. The ADC 400 may output the raw data to the ISP chain 500.

The ISP chain 500 may process the received raw data. For example, the ISP chain 500 may perform a variety of image processing such as image manipulation, and analysis recognition.

The ISP chain 500 may output the processed image to the processor 200. In an example, the ISP chain 500 may be implemented as a module inside the processor 200.

The processor 200 may receive depth information, position information, and a previous frame of the image from the memory 300. Further, the processor 200 may store the processed image in the memory 300.

The processor 200 may also receive visual information of an object from an external sensor or a host device. For example, the external sensor may receive depth information from a depth sensor and receive the visual information of the object from the host device or an output value of a simultaneous localization and mapping (SLAM) algorithm.

As in the augmented reality (AR) field, if the sensor data are combined with an artificially generated object, the amount of data transmitted using visual information of the object may be reduced.

In another example, the visual information may be directly obtained using raw data received from the sensor. For example, the processor 200 may obtain position information and depth information of the object from the raw data.

The processor 200 may determine a region occluded by the object in the image based on the obtained visual information. The processor 200 may determine a relative depth of the object in the image based on the depth information of the object included in the visual information.

The processor 200 may determine the occluded region based on the relative depth and the position information of the object included in the visual information.

If a dog-shaped object is combined with an image as in the example of FIG. 2, the processor 200 may obtain depth information and position information of the dog-shaped object, and determine a region occluded by the dog-shaped object based on the obtained depth information and position information.

The processor 200 may generate the valid data by excluding the region occluded by the object from the image. In the example of FIG. 2, the processor 200 may generate the valid data by excluding the region occluded by the dog-shaped object from the image.

Through this, the processor 200 may not transmit data corresponding to the portion occluded by the object, thereby reducing power consumption for data transmission.

Figure 3:
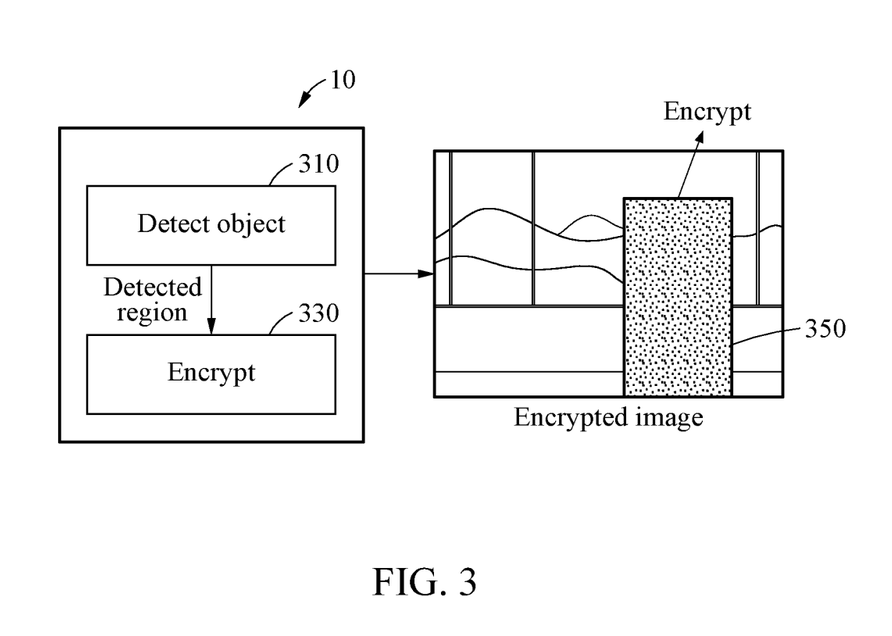
FIG. 3 illustrates an example of image processing performed by the image processing apparatus of FIG. 1.

FIG. 3 illustrates an example of image processing performed by the image processing apparatus of FIG. 1.

Referring to FIG. 3, in operation 310, the processor 200 may detect an object included in an image. The processor 200 may obtain visual information of the detected object. For example, the processor 200 may obtain position information of the object.

The processor 200 may generate valid data by transforming a region corresponding to the object in the image based on the position of the detected object. In operation 330, the processor 200 may generate the valid data by encrypting a region 350 corresponding to the object based on the position of the object.

In the example of FIG. 3, the processor 200 may detect the object and encrypt the region 350 corresponding to the object. Thus, the processor 200 may encrypt the region 350 corresponding to the object when encryption is needed for for reasons such as privacy or security of the object.

The processor 200 may generate the valid data based on coordinate information of the region 350 corresponding to the object. In an example, the processor 200 may generate the valid data for the region 350 corresponding to the object using at least two coordinates.

For example, the processor 200 may generate the valid data using the coordinates of a start point and the coordinates of an end point of the region 350 corresponding to the object. In this example, the coordinates of the start point may be the coordinates of an upper left vertex of the region 350 corresponding to the object, and the coordinates of the end point may be the coordinates of a lower right vertex of the region 350 corresponding to the object.

In other words, the processor 200 may transmit only the coordinate information of the region 350 corresponding to the object, except for the region 350, to a host device, thereby reducing power consumption.

Figure 4:
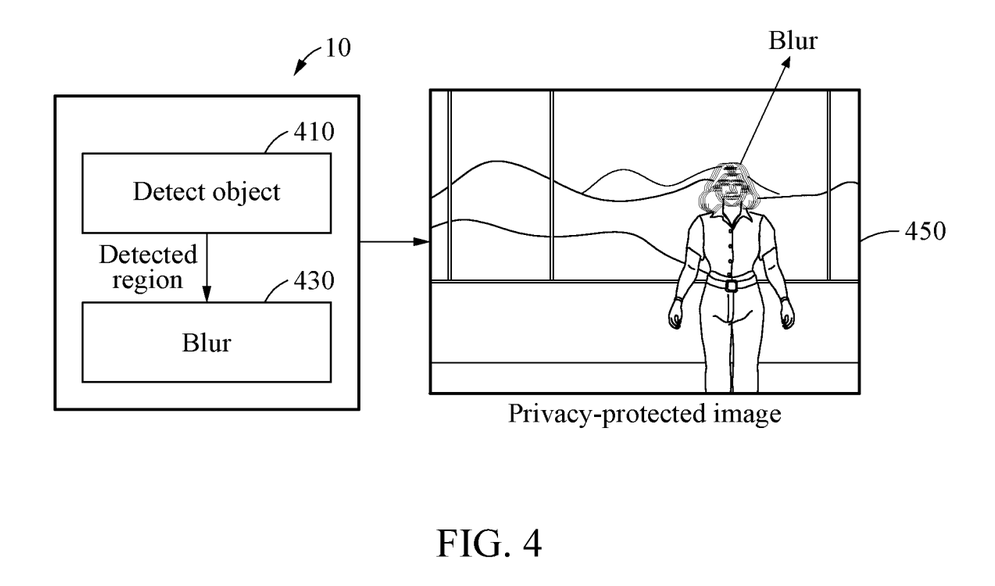
FIG. 4 illustrates an example of image processing performed by the image processing apparatus of FIG. 1.

FIG. 4 illustrates an example of image processing performed by the image processing apparatus of FIG. 1.

Referring to FIG. 4, in operation 410, the processor 200 may detect an object included in an image. The processor 200 may obtain visual information of the detected object. For example, the processor 200 may obtain position information of the object.

The processor 200 may generate valid data by transforming a region corresponding to the object in the image based on the position of the detected object. The processor 200 may generate valid data 450 by blurring the region corresponding to the object based on the position of the object.

In the example of FIG. 4, the detected object may be a human face. In an example, the processor 200 may blur the detected face and transmit the processed image to a host device to ensure privacy. That is, the processor 200 may generate an image with privacy protected through blurring as the valid data.

The processor 200 may not transmit data corresponding to the blurred portion to the host device.

Thus, the processor 200 may reduce a separate post-processing process, and reduce sensing data and transmit the reduced sensing data to the host device, thereby reducing power consumption.

Figure 5:
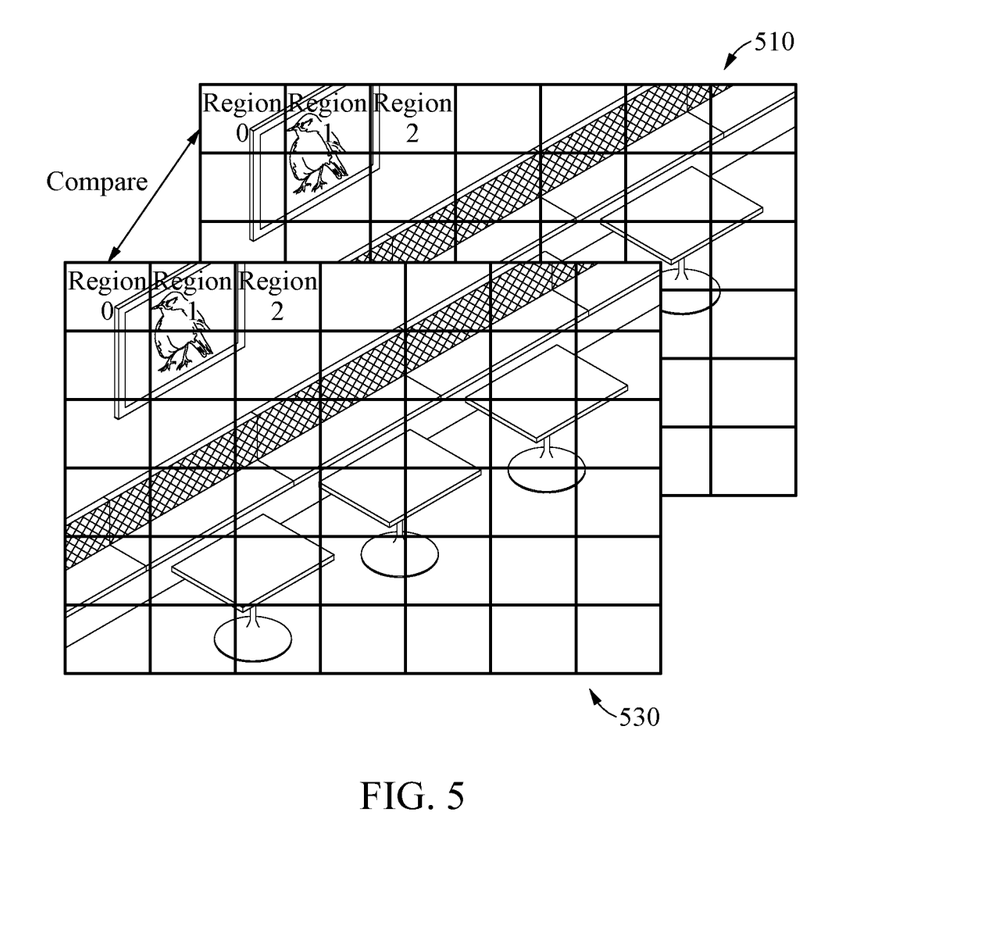
FIG. 5 illustrates an example of image processing performed by the image processing apparatus of FIG. 1.

FIG. 5 illustrates an example of image processing performed by the image processing apparatus of FIG. 1.

Referring to FIG. 5, when processing an image including temporally continuous frames having little change, the processor 200 may generate valid data using only a difference in pixel value between frames and transmit the valid data, thereby reducing power consumption.

The processor 200 may segment the image into a plurality of regions. In the example of FIG. 5, the processor 200 segments the image into 42 regions in 7 rows and 6 columns. However, it is possible to increase or decrease the number of regions according to examples. In another example, the processor 200 may also segment the image into shapes other than rectangles.

The processor 200 may determine a region in which a change in pixel value occurs among the plurality of regions. The processor 200 may generate the valid data based on the position of the region in which a change in pixel value occurs and the pixel value.

The processor 200 may allocate identifications (IDs) to the plurality of regions. In the example of FIG. 5, Region 0, Region 1, and Region 2 may indicate IDs assigned thereto. The processor 200 may compare a pixel value of a previous frame 510 and a pixel value of a current frame 530 of an image. For example, the processor 200 may determine whether a change in pixel value occurs by comparing Region 0 in the previous frame 510 and Region 0 in the current frame 530.

The processor 200 may receive the previous frame 510 from the memory 300 and compare the previous frame 510 with the current frame 530. For example, the memory 300 may include a delayed frame buffer.

In this example, if the pixel values are the same (that is, if there is no change in pixel value), the processor 200 may transmit, to a host device, a coincidence bit indicating whether the pixel value of the previous frame and the pixel value of the current frame are the same and an ID of the corresponding region. In other words, when the pixel values are the same, the processor 200 may generate valid data using the coincidence bit and the ID of the region and transmit the valid data.

When a change in pixel value occurs, the processor 200 may generate the valid data using the pixel value and the ID of the region in which the change occurs and transmit the valid data to the host device.

Thus, when there is little change in the frames of the image, the processor 200 may transmit only minimum data, thereby reducing power consumption.

Figure 6:
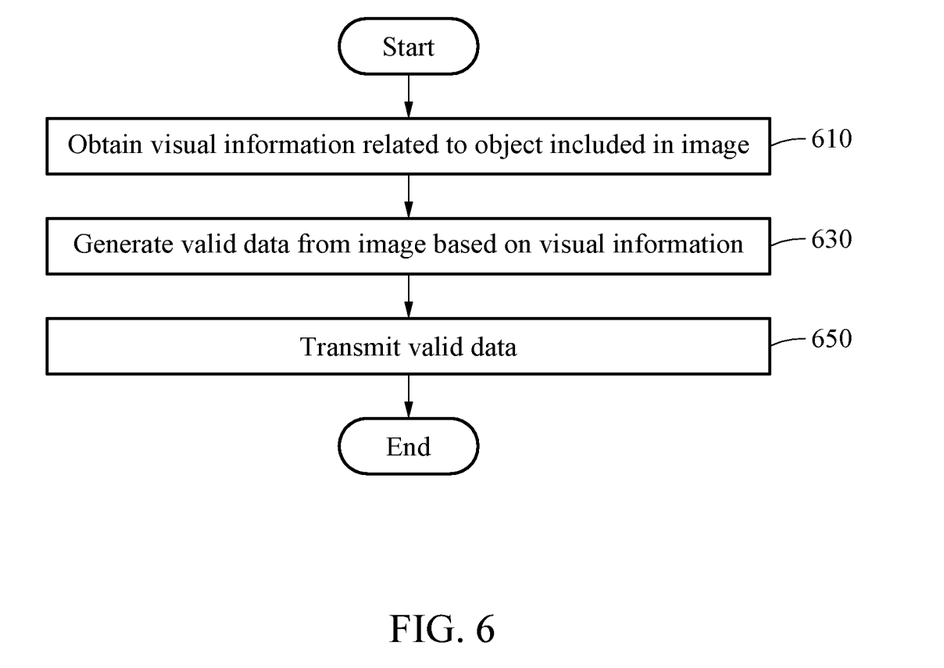
FIG. 6 illustrates an example of an operation of the image processing apparatus of FIG. 1.

FIG. 6 illustrates an example of an operation of the image processing apparatus of FIG. 1. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, in operation 610, the processor 200 may obtain visual information related to an object included in an image. The visual information may include depth information and position information of the object.

The processor 200 may calculate a change in pixel value between a current frame and a previous frame of the image. The processor 200 may store the previous frame of the image in the memory 300.

In operation 630, the processor 200 may generate valid data from the image based on the obtained visual information. The processor 200 may determine a region occluded by the object in the image based on the visual information.

The processor 200 may determine a relative depth of the object in the image based on the depth information of the object included in the visual information. The processor 200 may determine the occluded region based on the determined relative depth and the position information of the object included in the visual information.

The processor 200 may generate the valid data by excluding the occluded region from the image.

The processor 200 may generate the valid data by transforming a region corresponding to the object in the image based on the position of the object. The valid data may be generated by encrypting the region corresponding to the object based on the position of the object. The processor 200 may generate the valid data by blurring the region corresponding to the object based on the position of the object.

Further, the processor 200 may segment the image into a plurality of regions. The processor 200 may determine a region in which a change in pixel value occurs among the plurality of regions. The processor 200 may generate the valid data based on the position of the region in which a change in pixel value occurs and the pixel value.

In operation 650, the processor 200 may transmit the generated valid data.

The image processing apparatus 10, receiver 100, ADC 400, image signal processing (ISP) chain 500, and other apparatuses, devices, units, modules, and components described herein with respect to FIGS. 1, 2, 3, 4, and 5 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods illustrated above that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the image processing method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image processing apparatus, comprising:
a processor configured to:
obtain an image;
identify an object to be secured in the image;
generate valid data by encrypting a region corresponding to the object based on a position of the object; and
transmit the valid data.

2. An image processing apparatus, comprising:
a processor configured to:
obtain an image;
identify an object to be secured in the image;
generate valid data by blurring a region corresponding to the object based on a position of the object; and
transmit the valid data.

3. The image processing apparatus of claim 2, wherein data corresponding to the blurred region is not transmitted.

4. An image processing method, comprising:
obtaining previous frame and current frame, for an image;
calculating a change in pixel value between the previous frame and the current frame;
generating valid data based on the change in pixel value; and
transmitting the valid data.

5. The image processing method of claim 4, wherein the previous frame is stored in delayed frame buffer.

6. The image processing method of claim 4, wherein the generating the valid data comprises:
segmenting the image into a plurality of regions;
determining the first region in which a change in pixel value occurs and the second region in which a change in pixel value does not occur; and
generating the valid data based the first region and the second region.

7. The image processing method of claim 6, wherein the valid data comprises:
for the first region, a coincidence bit indicating that pixel value of the previous frame and pixel value of the current frame are the same and an ID of the first region; and
for the second region, a change in pixel value between the previous frame and the current frame and an ID of the second region.

* * * * *